Feb. 7, 1950   H. HAIDEGGER   2,496,664
SLIDER FOR SLIDE FASTENERS
Filed July 8, 1948
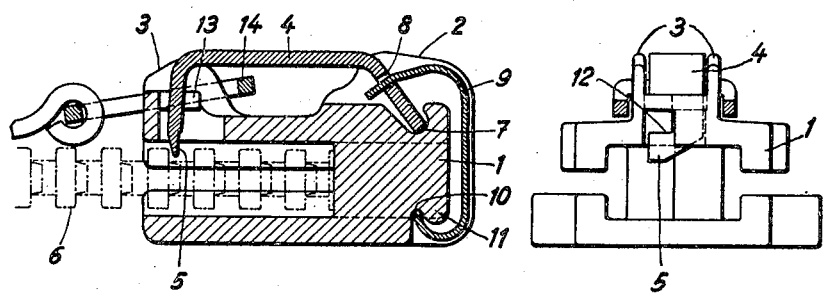
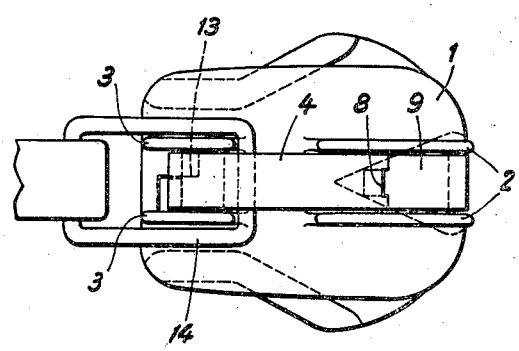
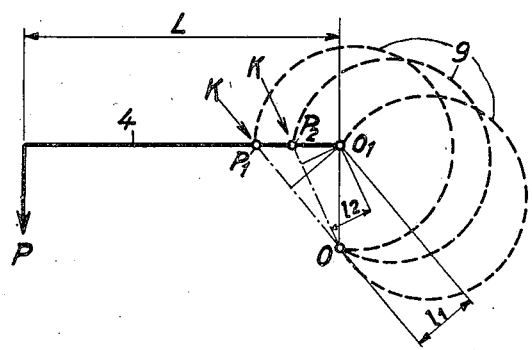
Inventor
Hans Haidegger

UNITED STATES PATENT OFFICE 2,496,664

SLIDER FOR SLIDE FASTENERS

Hans Haidegger, Soleure, Switzerland, assignor to Ebauches S. A., Grenchen Soleure, Switzerland Application July 8, 1948, Serial No. 37,702
In Switzerland January 24, 1948

6 Claims. (Cl. 24—205.14)

My invention relates to slides for slide-fasteners.

In slides for slide-fasteners known up to date the pawl cooperating with the cramps of the slide-fastener formed a spring. If this spring pawl was so dimensioned that no breakage was to be feared, the force exerted by the pawl on the cramps became so great that adjusting the slide was very toilsome. If, on the contrary, the spring pawl was so dimensioned as to allow an easy adjusting of the slide, breaking of the pawls was very frequent. As the springs, in these known slides, were not accessible but covered by the body part, the slides, on breakage of the spring, were lost.

Object of my invention is to remedy the above-mentioned inconveniences. To attain this aim, I provide a slider which is characterised in that the pawl forms a lever which is supported on the body part of the slide and which is under the influence of a spring supported on the said body part. For this slide a strong spring may be chosen for which danger of failure does not exist, while the point of application of this spring on the lever may be provided only so far from the point of support of this lever on the body part that the force at the cramp-engaging end of the lever allows an easy manipulation of the slide.

Another object of my invention is to shape the slide in such a way that lever and spring lie open towards the outside so that in the case of failure they may be removed and replaced by spare parts. This replacing may be carried out by any salesman in a shop. Therefore, the user has not to replace the whole slide but only the much cheaper lever and/or spring.

Other objects and features will be apparent as the following description proceeds, reference being had to the accompanying drawings, illustrating one embodiment of my invention. It is understood that the invention is not necessarily limited thereto, as various changes in the shape, proportions and assemblage of the parts may be resorted to without departing from the principle of the invention or sacrificing any of its advantages.

Fig. 1 is an elevational longitudinal section of the slide or slider embodying the invention in a practical form, Fig. 2 is a rear view of the slide, and Fig. 3 a plan view of the slide.

Fig. 4 is a diagram showing the proportion of the spring force and the pawl force.

The body part 1 of the slide has two pairs of cheeks 2 and 3 respectively. Between these cheeks lies a pawl 4 one end 5 of which is directed to the tail end of the slider and cooperates with the cramps 6 of a slide-fastener. This pawl 4 forms a sturdy lever supported in a recess 7 of the body part 1. Nearer to the end supported in the recess 7 the lever 4 has a slot 8 receiving one end of a spring 9. This spring forms a cramp whose other end engages in a recess 10 of the body part 1, lying behind a bead 11 formed on the lower portion of the flaring head end of the body part 1. On its one end adjacent to the tail end of the slider, lever 4 has an opening 12 in which engages a stop 13 of the body part 1. By this stop the lever 4 is prevented from jumping out when a pull is exerted on it by the member 14.

Fig. 4 illustrates in a schematic way the proportion between the force of the spring 9 acting upon the lever 4 and the force at the end 5 of lever 4 acting upon the cramps 6. In Fig. 4 O means the point of support of the spring 9 in the recess 10; $O_1$ the point of support of the lever 4 in the recess 7, and $P_1$ and $P_2$ designate two different points of application of the spring 9 on the lever 4. P means the force exerted on the cramps 6 by the lever 4. The three dotted arcs of a circle indicate schematically the spring 9 in three different positions, corresponding to three different values of the force P. In all positions of the spring its force K goes through the point O. Assuming that the point of application of the spring 9 on the lever 4 is $P_1$, the perpendicular distance of the line of action of the spring force K from the point $O_1$ is $l_1$. The lever 4 having a length L, the following equation exists: $P.L = K.l_1$, and $$P = \frac{K.l_1}{L}$$

It may be seen that the smaller the distance $l_1$ at a given length L, the smaller P. This means that even if a strong spring 9 be chosen, P may be kept within reasonable limits by choosing the distance $l_1$ small enough. Assuming, for instance, the point of application of the spring on lever 4 to be at $P_2$. Then, P becomes smaller than in the case of $P_1$ in that $l_2$ is smaller than $l_1$. If the point of application of the spring 9 lies in $O_1$, then P=0.

As may be seen in Figs. 1 to 3, spring 9 between the cheeks 2 and lever 4 between the cheeks 2 and 3 lie open towards the outside. Therefore, in the case of breakage, lever 4 and/or spring 9 may be removed and replaced by spare parts.

without any disassembling of portions of the body part 1 becoming necessary.

While I have described and illustrated one embodiment of my invention, I do not wish to unnecessarily limit the scope of this invention, but reserve the right to make such modifications and rearrangements of the parts as may come within the purview of the accompanying claims.

1. A slider for a slide fastener, comprising in combination, a slider body adapted to slide along a series of slide fastener elements and having a flaring head portion and a tail portion, each of said portions having a front face and a rear face; a frontal abutment on the front face of said flaring head portion of said slider body; a pawl having one end portion turnably engaging said frontal abutment so that the other end portion of said pawl is turnable into engagement with said slide fastener elements locking the same and out of engagement with said slide fastener elements; a rearwardly directed retaining portion on said slider body disposed rearwardly of said frontal abutment; and a substantially C-shaped clamping spring having a rear end portion bent inwardly engaging said rearwardly directed retaining portion and having a front end portion engaging said pawl at a point thereon spaced from said frontal abutment and thereby holding said pawl in engagement with said frontal abutment.

2. A slider for a slide fastener comprising in combination a slider body with a flaring head end and a tail end and adapted to slide along a series of slide fastener elements; an upper abutment on said flaring head of said slider body; a pawl having one end portion turnably engaging said upper abutment so that the other end portion of said pawl is turnable into engagement with said slide fastener elements locking the same and out of engagement with said slide fastener elements; a downwardly projecting portion on said slider body arranged below said upper abutment; and a C-shaped spring having a lower end portion bent inwardly engaging said downwardly projecting portion on said slider body and having an upper end portion engaging said pawl forwardly of said upper abutment and holding thereby said pawl in engagement with said upper abutment.

3. A slider for a slide fastener, comprising in combination, a slider body adapted to slide along a series of slide fastener elements and terminating at one end in a flaring head portion and at the other end in a tail portion having an opening in the latter leading inwardly to the slide fastener elements upon which the slider body is slidably mounted, each of said portions having a front face and a rear face; a frontal abutment on the front face of said flaring head portion of said slider body; a pawl having one end portion turnably engaging said frontal abutment so that the other end portion of said pawl is turnable into engagement through the opening in said tail portion with said slide fastener elements locking the same and out of engagement with said slide fastener elements; a rearwardly directed retaining portion on the flaring head portion of said slider body disposed rearwardly of said frontal abutment; and a substantially C-shaped clamping spring having a rear end portion bent inwardly engaging said rearwardly directed retaining portion and having a front end portion engaging said pawl at a point thereon spaced from said frontal abutment and thereby holding said pawl in engagement with said frontal abutment.

4. A slider for a slide fastener, comprising in combination, a slider body adapted to slide along a series of slide fastener elements and having a flaring head portion and a tail portion, each of said portions having a front face and a rear face; a frontal abutment on the front face of said flaring head portion of said slider body; a pawl having one end portion turnably engaging said frontal abutment so that the other end portion of said pawl is turnable into engagement with said slide fastener elements locking the same and out of engagement with said slide fastener elements, said pawl having an aperture therethrough spaced a short distance from the one end portion thereof engaging said frontal abutment; a rearwardly directed abutment on the flaring head portion of said slider body disposed rearwardly of said frontal abutment; and a substantially C-shaped clamping spring having an inwardly bent rear end portion engaging said rearwardly directed abutment and having a front end portion engaging in the aperture in said pawl at a point spaced from said frontal abutment and thereby holding said pawl in engagement with the latter abutment.

5. A slider for a slide fastener, comprising in combination, a slider body adapted to slide along a series of slide fastener elements and having a flaring head portion and a tail portion having an opening in the latter leading inwardly to the slide fastener elements upon which the slider body is slidably mounted, each of said portions having a front face and a rear face; a frontal abutment on the front face of said flaring head portion of said slider body; an elongated externally convex pawl having one end portion turnably engaging said frontal abutment so that the other end portion of said pawl is turnable through the opening in the tail portion of said said slider body into engagement with said slide fastener elements locking the same and out of engagement with said slide fastener elements, said pawl having an aperture therethrough spaced a short distance from the one end portion thereof engaging said frontal abutment; a rearwardly directed abutment on the flaring head portion of said slider body disposed rearwardly of said frontal abutment; a stop fixed on said slider body at the opening in the tail portion thereof; a substantially C-shaped clamping spring having an inwardly bent rear end portion engaging said rearwardly directed abutment and having a front end portion engaging in the aperture in said pawl at a point spaced from said frontal abutment and thereby holding said pawl in engagement with the latter abutment; and a lateral hook fixed upon the front end portion of said externally convex pawl for engaging with the stop on said slider body when said front end portion of said pawl is disengaged from the slide fastener elements in order to prevent loss of said pawl from said slider body.

6. A slider for a slide fastener, comprising in combination, a slider body adapted to slide along a series of slide fastener elements and having a flaring head portion and a tail portion, each of said portions having a front face and a rear face; a frontal abutment on the front face of said flaring head portion of said slider body; a pawl having one end portion turnably engaging said frontal abutment so that the other end portion of said pawl is turnable into engagement with said slide fastener elements locking the same and out of engagement with said slide fastener elements; a rearwardly directed retaining portion on said slider body disposed rearwardly of said frontal abutment; a stop fixed on the tail portion of said slider body; a lateral projection forming a retaining hook upon said other end portion of said pawl disposed in effective position to engage with the lateral projection to prevent loss of the pawl from said slider body and having a predetermined limited degree of play with respect to said lateral projection to allow said other end of said pawl to be turnable into and out of engagement with said slide fastener elements; and a substantially C-shaped clamping spring having a rear end portion bent inwardly engaging said rearwardly directed retaining portion and having a front end portion engaging said pawl at a point thereon spaced from said frontal abutment and thereby holding said pawl in engagement with said frontal abutment.

HANS HAIDEGGER.

REFERENCES CITED

The following references are of record in the file of this patent:

UNITED STATES PATENTS

| Number | Name | Date |
|---|---|---|
| 2,261,713 | Bongright | Nov. 4, 1941 |
| 2,286,373 | Rabinow | June 16, 1942 |
| 2,296,825 | Carlile | Sept. 29, 1942 |
| 2,299,133 | Epes | Oct. 20, 1942 |

FOREIGN PATENTS

| Number | Country | Date |
|---|---|---|
| 211,614 | Switzerland | of 1940 |
| 648,831 | Germany | of 1937 |